(No Model.)

E. M. BYRKIT.
SAW MANDREL.

No. 335,336. Patented Feb. 2, 1886.

WITNESSES.
Gustav Bohn.
Hattie Henry.

INVENTOR.
Edwin M. Byrkit.
By C. P. Jacobs
Atty.

United States Patent Office.

EDWIN M. BYRKIT, OF INDIANAPOLIS, INDIANA, ASSIGNOR OF ONE-HALF TO JOHN H. MURRY AND ADDISON A. ADAIR, BOTH OF SAME PLACE.

SAW-MANDREL.

SPECIFICATION forming part of Letters Patent No. 335,336, dated February 2, 1886.

Application filed December. 23, 1885. Serial No. 186,573. (No model.)

*To all whom it may concern:*

Be it known that I, EDWIN M. BYRKI resident of Indianapolis, Indiana, have made certain new and useful Improvements in Adjustable Mandrels, a description of which is set forth in the following specification, reference being made to the accompanying drawings, in both figures of which like letters indicate like parts.

My invention relates to the construction of adjustable mandrels for carrying saws and similar devices, and will be understood from the following description.

Figure 1:
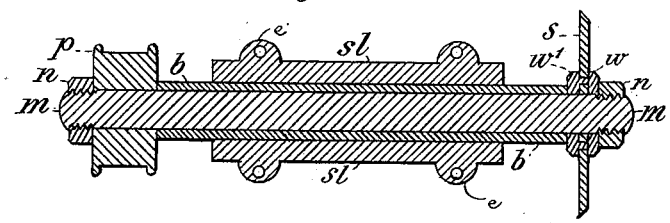
Figure 2:

In the drawings, Figure 1 represents a longitudinal section of the entire device, showing the relative position of the various parts. Fig. 2 is a side view of the same.

In detail, $m$ is the mandrel, of any convenient size and length, threaded at each end to receive the nuts $n$, the mandrel passing through a boxing, $b$, which is in turn inclosed in an outer boxing or sleeve, $s'$. This sleeve is formed in two equal parts or halves, which are secured together by bolts on the sides, which pass through projections or ears $e$, formed on each half of the sleeve, as shown in Fig. 2. This sleeve is shorter than the boxing $b$.

On one end of the mandrel is mounted the driving-pulley $p$, on the other end the saw $s$, and on either side this saw are washers $w\ w$, one of which may be provided with projections or pins adapted to pass through holes in the saw-blade to prevent its turning on the mandrel. The inner washer $w$ abuts against the end of the boxing $b$, and by tightening the nuts $n$ it is observed that the saw may be held very tightly in place upon the mandrel and also the pulley $p$. The sleeve $s'$ is fitted to clamp the boxing $b$ closely when the bolts which pass through the ears of the sleeve are tightened, and by loosening these bolts the mandrel with its boxing $b$ may be slipped along for some distance in either direction in the sleeve $s'$. This adjustment is often desirable to bring the tool or saw to the proper position for working it—as, for instance, in grooving lumber—and when the adjustment has been made, by again tightening the bolts the sleeve $s'$ is made to clamp the boxing $b$, firmly holding it in place, while such clamping does not interfere with the revolution of the mandrel $m$ inside the boxing $b$.

One application of this adjustable mandrel to the use of cutting grooves in lumber is shown in an application made by me for Letters Patent for a machine for grooving lath and sheathing, filed August 10, 1885, but as the device is applicable to different purposes; it is made the subject of this separate and distinct application.

What I claim, and desire to secure by Letters Patent, is the following:

1. The mandrel $m$, inclosed in the box $b$, the sleeve $s'$, clamped upon such boxing and secured by suitable means, the driving-pulley $p$, mounted on one end of the mandrel, the tool $s$, mounted upon the other end of such mandrel, and the nuts $n$, working upon the threaded end of such mandrel, all combined substantially as described.

2. A mandrel inclosed in a suitable boxing and adapted to revolve therein, the boxing clamped by a suitable sleeve formed in halves, the two parts secured together by suitable screws or bolts, the loosening of which will allow the mandrel and its boxing to be adjusted along the line of such sleeve, substantially as described.

3. A mandrel having a driving-pulley mounted upon one end and a revolving tool upon the other, inclosed in a suitable boxing in which the mandrel revolves, the boxing confined in a sleeve provided with means of clamping the sleeve upon the mandrel without interfering with the revolution of the mandrel in its boxing, all combined substantially as described.

In witness whereof I have hereto set my hand this 15th day of December, 1885.

EDWIN M. BYRKIT.

Witnesses:
  C. P. JACOBS,
  HATTIE MURRY.